United States Patent Office 3,227,239
Patented Jan. 4, 1966

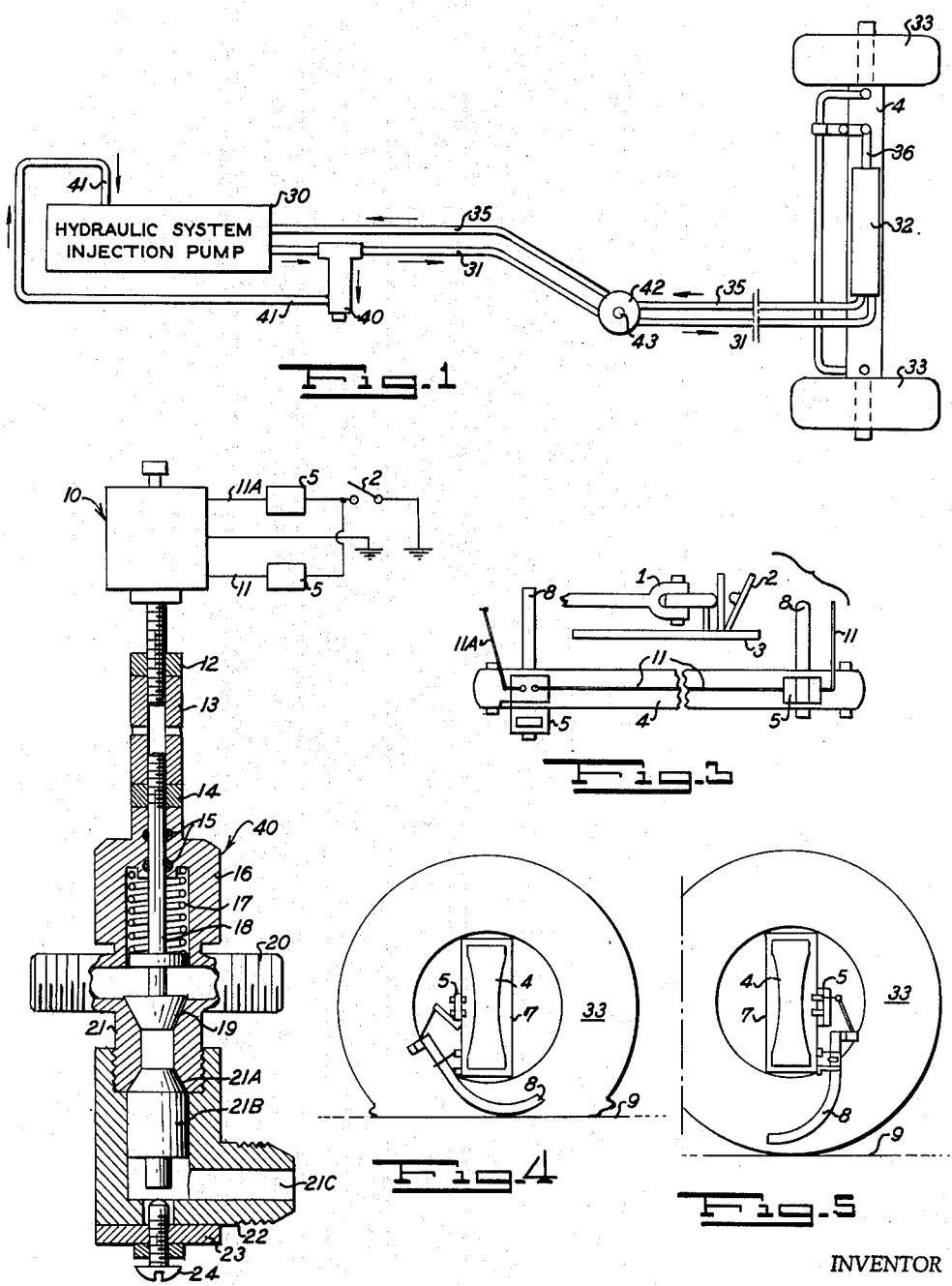

3,227,239
POWER STEERING SYSTEM FOR MOTOR VEHICLES
Roque Garza Villarreal, Orozo y Berra 201–203, Santa Maria La Ribera, Mexico
Filed Dec. 10, 1963, Ser. No. 329,574
3 Claims. (Cl. 180—79.2)

This invention relates to power steering systems for motor vehicles and is more particularly concerned with the use of a pressure regulator for controlling the flow of liquid in such system in accordance with driving conditions.

As is well known, sometime ago there were introduced into automobiles, various systems of hydraulic steering, thereby making smoother the operation of the same. These hydraulic steering systems have excellent advantages, such as: to facilitate the driving movement of a vehicle when running at very low speed, as well as assuring that the steering does not move when any of the front tires of a vehicle has a blowout or flat, since with the hydraulic system it becomes difficult to move the front wheels upwards, therefore, the wheels are kept rigid thus preventing, to a great percentage, any accidents due to this cause. According to the last statistical data of the Federal Traffic Department of Mexico however, when such accidents occur due to the fact that the highway is wet, frozen, covered with snow or slippery because of any cause; it has been demonstrated that the major proportion of the accidents are caused because the hydraulic steering system, at high speeds, cannot be sensed by the vehicle's driver, since the natural smoothness of this system increases with the speed, to such extent, that many times the driver of a vehicle takes a curve and when he comes out of same, if it is slippery, he cannot sense if he has straightened completely the front wheels. Therefore, when the driver once more takes the straight road, the front wheels might be a little tilted due to the lack of sensing in the steering wheel. From the foregoing it becomes extremely necessary to use in combination with the hydraulic system, some means, whether mechanical, electro-mechanical, or otherwise, that may automatically change the hydraulic steering system, so that the driver of the vehicle may sense, at high speeds, the right position of the front assembly of his vehicle. The use of a pressure regulator in accordance with this invention for controlling the hydraulic system associated with a vehicle's steering mechanism is referred to as such because by the devised mechanical combination, it regulates the liquid pressure delivered by the pump to the piston that operates the front assembly of the hydraulic steering in vehicles and because the regulation exercised by this apparatus takes place at the pressure line, returning automatically all over-pressure or excess to the pump. The automatic control functions to operate the pressure regulator when the vehicle driver shifts gears from low to high speeds, the latter being the ones that make the connection to actuate the pressure regulator, either by electro-magnetic means or by compressed air, or mechanically hydraulically or on a suction basis by means of the vehicle's own engine.

It will be understood from the foregoing that it is a purpose of this invention to provide an improved steering mechanism which will enable the driver of a vehicle provided with hydraulic steering to be better able to sense or feel through the steering wheel the correct position of the front wheels at all times and especially when he is running at high speeds on slippery roads and thereby avoid the usual accident risks under such conditions.

The characteristic details of this pressure regulator to control the hydraulic system of a vehicle's steering are disclosed in the following description and the accompanying drawings as an illustration of said description; similar reference numbers indicating like parts in the figures shown.

In the drawings, FIG. 1 is a diagrammatic view indicating generally the hydraulic system of a motor vehicle and showing the manner in which a pressure regulator is embodied therein in accordance with the invention;

FIG. 2 is a diagrammatic view showing in greater detail the construction and arrangement of the pressure regulator in the hydraulic system and indicating the circuit in which it is included;

FIG. 3 is a diagrammatic top plan view of the front axle and associated parts; and FIGS. 4 and 5 are diagrammatic side elevational views of certain of the parts shown in FIG. 3.

In the motor vehicle mechanism shown in FIG. 1 of the drawings, the reference numeral 30 indicates generally the pump for injecting the hydraulic liquid under high pressure into the pressure line 31 which communicates with the master cylinder 32 associated with the axle 4 for the front wheels 33, 33 and provided with a piston 36 for actuating such front wheels in the steering of the vehicle. The liquid returns from the master cylinder to the pump 30 through return line 35. Connected to the pressure line 31 in accordance with the invention is a pressure regulator designated generally by the reference numeral 40. The regulator 40 is connected to the inlet end of the pump 30 by a return bypass conduit 41. Connected to the hydraulic system is the steering wheel 42 mounted on its axle 43.

Referring now to FIGS. 3 to 5 of the drawings, the reference numeral 1 indicates generally the rod and yoke that moves the fourth gear in a bus transmission, and shows the manner in which the electric switch 2 is actuated by such rod and yoke, such switch being installed on the transmission cover 3.

The reference numeral 4 indicates a projection of a length of the front axle of a vehicle, seen from the front, and showing the automatic controls 7 composed of the power switches 5, one of which is shown opened in FIG. 4 due to a blowout of a front tire.

FIG. 5 of the drawings shows the automatic power switch 5, in its closed position or making contact since the automatic control 7 is idle.

The controls 7 for the emergency of a flat or blowout front tire, are installed as near as possible to each end of the front axle. These controls as stated include the switches 5 from which the delivery of a negative current begins through the electric conductor 11 to the switch 2 and when this is actuated by the lever 1 it continues supplying negative electric current to the terminal 11 of the electro-magnetic valve or servo 10 so that the steering wheel, on closing the circuit by means of the cable 11–A supplies positive current and which goes directly from the storage battery of the vehicle to one of the terminals of the switch 2. The hydraulic pressure regulator 40 is shown in detail in FIG. 2 of the drawings and is constructed as follows: A lock nut 12 joins the output bar of the electro-magnetic valve 10 with a tension device 13 consisting of two internal threads, one of which is clockwise and the other counterclockwise, to enable accurate adjustment of the amount of pressure that the needle 18 should let pass through back to the pump 30 by means of the bypass bend 22 and duct 21–C which form part of the return conduit 41. The lock nut 14 is intended for keeping the adjustment of the tension device 13. The gaskets of resilient material 15 are installed in the inner grooves of the needle guide 18 in the plug 16 which holds the spring 17 so that the same will always try to close, by its spring action, the valve part of the needle 18 on the seat 19 of the cross member 21, thereby supplying the total liquid pressure through duct 20 which forms part of the pressure line 31 and thus providing the steering or motor cylinder 32 in the hydraulic system with full power. The seat 21–A is for an emergency closing or regulation of pressure and it operates by the action of the needle 21–B to return the bypassed liquid into the pump by means of the duct 21–C forming part of return conduit 41. The bend 22 is attached to the cross member 21 threading at the over-pressure return outlet to the pump. The plug 23 carries at its center the set screw 24 to fix the position of the needle 21–B.

The automatic controls 7 include a proper wall plate by which they may be fixedly secured to the front axle and so that the lever 8 in each of such controls which operates the electric current automatic switch 5 lies at the lower point of the inner diameter of the wheel's rim so that precisely when the axle falls due to a blowout or flat tire as shown in FIG. 4 this lever 8 might touch the pavement's level shown in the drawing with the lines marked with numeral 9 the conventional heights of the pavement or ground. In the condition of the parts shown in FIG. 4 the automatic switch 5 is open, thereby disconnecting the continuous supply of negative current, and inactivating the electro-magnetic valve 10, whereupon immediately the spring 17 pushes the needle 18 and this needle fully closes, the liquid return duct through the seat 19 and the hydraulic steering system being thereby put in operation.

I claim:

1. In combination with a motor vehicle having a steering wheel, power steering apparatus connected to said steering wheel and including a hydraulic system composed of a cylinder having a piston for actuating the front wheels of the vehicle in the steering thereof, and a pump to supply liquid under high pressure to said cylinder, of a pressure regulator contained in the pressure line from said pump to said cylinder and including a first passageway forming part of said pressure line, and a second passageway communicating with said first passageway, a conduit connecting said second passageway with the inlet end of said pump, said second passageway and conduit forming a return bypass passageway for liquid entering into said second passageway from said first passageway, a first valve in said pressure regulator controlling the flow of liquid from said first passageway to said second passageway and operable from a fully closed position at which said hydraulic system is operable to assist the driver to operate the steering wheel to an opened position wherein sufficient liquid is removed from said pressure line through said second passageway to reduce substantially the pressure of the liquid to said cylinder and thereby the assistance of said hydraulic system to the driver, biasing means for normally maintaining said first valve in fully closed position, means including a servo connected to said first valve and operable in response to the shifting of the vehicle transmission from a lower to a higher driving ratio to open said first valve against the force of said biasing means and thereby reduce the effectiveness of the hydraulic system to assist the driver, and a second valve in said pressure regulator for regulating the flow of liquid through said bypass passageway when said first valve is open, said second valve comprising a valve element controlling the flow of liquid through said second passageway to said conduit, and means for adjusting the open position of said valve element to vary the quantity of liquid flow through the bypass.

2. The combination defined in claim 1 with the axle of a front tired wheel of the vehicle, of an actuating lever carried by said axle and arranged to engage and be moved by the pavement when the tire on such wheel deflates from its normal pressure condition, said actuating lever being connected to and controlling said first valve operable means and operative on movement thereof by the pavement to render said operable means unable to hold said first valve in open position against the force of said biasing means, whereby said biasing means moves said first valve to closed position and thereby restores the high pressure to the liquid supplied to said cylinder.

3. The combination defined in claim 1, in which said first valve operable means comprises means mechanically connected to a transmission lever of the vehicle and controlled by the operation of such lever to operate said operable means.

References Cited by the Examiner

UNITED STATES PATENTS

| 2,139,391 | 12/1938 | Tibbetts | 180—79.2 |
| 2,341,502 | 2/1944 | Ingres | 180—79.2 |
| 2,899,006 | 8/1959 | Brown et al. | 180—79.2 |
| 2,902,104 | 9/1959 | Schilling | 180—79.2 |

FOREIGN PATENTS 803,194  10/1958  Great Britain.

BENJAMIN HERSH, *Primary Examiner.*

A. HARRY LEVY, *Examiner.*

E. E. PORTER, L. FRIAGLIA, *Assistant Examiners.*